WALTER J. WEYERTS
*INVENTOR*

Patented Feb. 8, 1944

2,341,406

UNITED STATES PATENT OFFICE 2,341,406

MOTION PICTURE SOUND RECORD

Walter J. Weyerts, Rochester, N. Y., assignor to Eastman Kodak Company, Rochester, N. Y., a corporation of New Jersey Application December 22, 1942, Serial No. 469,815

15 Claims. (Cl. 101—149.1)

This invention relates to motion picture films having sound records and more particularly to motion picture color films having sound records.

The requirements of a motion picture sound record are well known, perhaps the most important of which is that the record be composed of a material highly absorptive of the radiations to which the photocell in use is sensitive. For the cesium cell a silver sound record is desirable since it absorbs radiations of the order of 800 mu. to which the cell has its maximum sensitivity.

In the preparation of prints of motion pictures in color bearing sound records, by means of an imbibition process from dyed color separation reliefs, it has been a practice to form the sound record in a sensitive photographic film by means of the usual steps of exposure, development and fixation. In order to print the three color-separation relief images onto this film bearing the sound record, it is then necessary to unmordant the film to make it suitable for transfer of the dye images from the dyed relief images.

The present invention provides a method eliminating the use of a sensitive photographic film for recording the sound and picture images and dispenses with certain processing steps formerly necessary. Also, since the sound record may be obtained from one of the color component relief films only three separate relief films are required for making all imbibition transfers.

One object of the present invention is to provide a method of printing both sound and colored picture images from imbibition matrices onto a pre-mordanted imbibition blank.

Another object is to provide a method of printing sound and colored picture images from an imbibition matrix bearing a sound relief image and a dyed color-separation relief picture image onto a pre-mordanted imbibition blank. Other objects will appear from the following description of my invention.

The objects of my invention are in part accomplished by a series of steps including forming a relief image of the sound in a photographic layer, then treating this relief image throughout with a substance capable of reducing a silver compound contained in a mordanted imbibition blank to which the compound in the relief image is transferred. The transferred image then either reduces, or by subsequent treatment may be caused to reduce, the silver salt to a silver sound image at the point of the transfer. If desired, instead of having the silver salt in the imbibition blank it may be applied in the form of a treating solution after the reducing compound has been transferred from the relief image.

My invention is illustrated as shown in the accompanying drawing where,

My invention will now be described by means of examples, with reference to the accompanying drawing.

Figure 1:
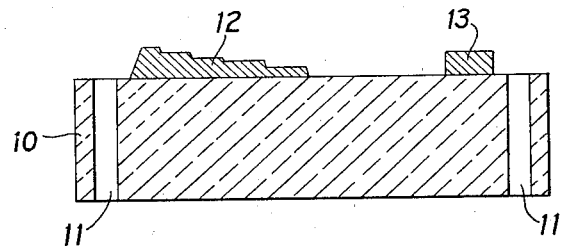
Fig. 1 shows in enlarged cross-sectional view the appearance of a motion picture film carrying sound and picture images in relief.

Example 1.—In a well-known manner, a light sensitive motion picture film carrying an unhardened gelatin silver halide emulsion layer suitable for forming relief images is exposed to a color-separation negative such as the blue-separation negative, carrying the sound image, or if desired the sound may be printed from a separate film; picture and sound relief images are then formed in the layer by usual method of differentially hardening the gelatin and washing out the unhardened portion of the layer. The result is to obtain a gelatin relief film of the type shown in Fig. 1 where layer 10 is a support of cellulose ester or similar material carrying on one surface thereof between the perforations 11, a picture image relief 12 and the sound relief image 13.

Figure 2:
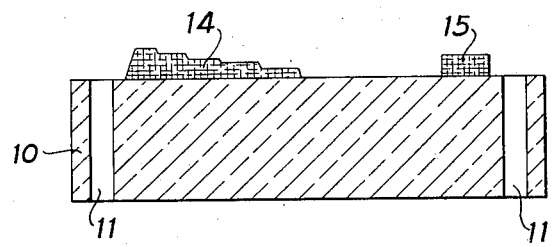
Fig. 2 shows in enlarged cross-sectional view the appearance of the film of Fig. 1 carrying dyed sound and picture relief images.

The relief images are then dyed with a suitable imbibition dye such as a yellow dye if the relief image 12 corresponds to the blue component, or magenta or cyan dyes if the relief corresponds to the green or red components respectively. The dyed film appears as shown in Fig. 2 of the drawing according to which the perforated base 10 carries the yellow dyed picture relief image 14 and the yellow dyed sound relief image 15. If desired, only the picture relief image may be dyed and the sound relief image treated separately as described below.

According to one embodiment of my invention the dyed film is then treated only in the sound track area by means of an applicator roll, or by edge-dipping, with a solution of an organic compound capable of reducing silver compounds, for example, silver oxide, silver phosphate, silver oxalate, silver halide, etc. A compound suitable for this purpose is hematoxylin. Other compounds given as examples of typical reducing compounds useful in my invention are: hydroxy flavones, e. g., quercetin and quercitrin; tannins, tannic acid, gallic acid, alizarin dyes which are adapted to imbibition printing and reduce the silver compounds, other polyhydroxy anthraquinones, e. g., anthragallol; gallein, gallin or reducing aldehydes adapted to imbibition printing. Hematoxylin gallein and gallin constitute preferred embodiments of my invention inasmuch as they have wide range of reducing action for silver salts regardless of pH, that is, at pH greater or less than 7. Gallin, however, has not been observed to reduce silver halides under the conditions of the invention.

More simple reducing compounds such as hydroquinone, catechol, etc., may be used but in general are not as satisfactory. The compound should have a fairly high molecular weight, yet it should not have such a large molecule that it will diffuse with difficulty through gelatin or other colloidal material used for forming the relief image. Also, the compound should have the property that it can be mordanted in a colloid layer such as gelatin. To satisfy this requirement, the compounds should have a hydroxyl and other group, or a plurality of hydroxyl groups so arranged in the molecule that the compound will form complexes with metals, and the compounds of course must reduce the silver compounds mentioned.

In this specification and the appended claims wherein I refer to the reducing organic compounds as being adapted for imbibition printing I mean that, in addition to being capable of reducing silver compounds, they have molecular size and diffusion characteristics which make them suitable for transferring from a relief image to an imbibition blank with good definition.

In the present example, hematoxylin is used for treating the sound relief and this compound is especially adapted for the purpose of the invention since it is readily diffusible in a colloid layer such as gelatin, yet the size of the molecule is not so large that diffusion cannot be controlled. The fact that the compound is readily mordanted is also of importance as will be seen later.

Figure 3:
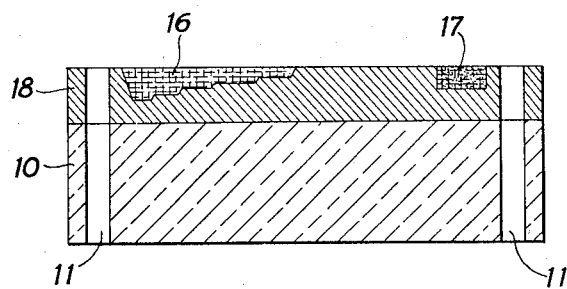
Fig. 3 shows in enlarged cross-sectional view the appearance of an imbibition blank after transferring picture and sound images to it from the relief film of Fig. 2 in the manner of my invention.

The film now containing dyed relief images, and the sound relief image in addition containing the organic reducing compound, is then positioned with the relief side down onto a chrome alum mordanted gelatin blank. The hematoxylin in the sound relief image transfers to the gelatin blank as does the yellow dye in both relief images. The mordanted hematoxylin sound image is then treated for five seconds in a 5 per cent solution of sodium bisulfite and quickly rinsed and treated with ammoniacal silver nitrate solution which is reduced to silver in the region of the mordanted hematoxylin image. The sound image produced was neutral gray. The appearance of the imbibition print after processing as described, is shown in Fig. 3 where the perforated support 10 is shown as carrying the gelatin layer 18 containing the imbibed yellow dye picture image 16 and the colored silver sound image 17.

*Example 2.*—In a manner similar to that described in Example 1, a hardened, chrome alum mordanted gelatin blank was further mordanted by placing it in 1 per cent sodium hydroxide solution for 10 seconds, rinsing 10 seconds in water, placing in 5 per cent cupric chloride solution for 20 seconds, and washing. The transfer was made and when the transfer image of hematoxylin was placed in warm ammoniacal silver nitrate solution, a red-colored silver sound image was obtained.

*Example 3.*—A blank gelatin-coated film was mordanted with copper solution as described in Example 2, and was then placed in a 1 per cent solution of sodium perborate for 20 seconds and washed before using for a transfer of hematoxylin. The deep blue sound image obtained by the transfer was placed in warm ammoniacal silver nitrate solution for a short time, cleared in sodium thiosulfate solution and washed. The silver sound image obtained had good definition and was practically neutral in color. The density of the image measured by a cesium photo-electric cell indicated it was sufficiently high for either variable area or variable density sound track.

*Example 4.*—A film base was coated with a gelatin solution of the following composition:

| | | |
|---|---|---|
| Gelatin | grams | 100 |
| $K_2Cr_2(SO_4)_4 \cdot 24H_2O$ | do | 5 |
| $(NH_4)_2Cr_2O_7$ | do | 1 |
| Glycerin | cc | 13 |
| Water to | cc | 1600 | the pH of which was adjusted to 3.2 with formic acid.

The mordanted film was soaked for 10 seconds in a 1 per cent solution of sodium perborate and washed for 2 minutes before using for a transfer. The hematoxylin transfer was treated with sodium bisulfite and ammoniacal silver nitrate, as described in Example 1. The silver sound image obtained was bluish-gray and had good definition.

Other mordants besides those specifically mentioned above may be used and are those types of compounds listed in the literature as suitable for mordanting various materials for dyeing. The following are elements whose compounds are especially useful as mordants: aluminum, chromium, copper, iron, nickel, cobalt, titanium, zirconium, tin, lead, zinc, cadmium, antimony, manganese, bismuth, uranium, tungsten, molybdenum, thorium, vanadium, and cerium.

In the examples above, ammoniacal silver nitrate solution was used to convert the hematoxylin image to silver. However, other solutions of silver salts such as silver nitrite dissolved in a solution of sodium nitrite or silver sulfite dissolved in a solution of sodium sulfite may be used.

In another embodiment of my invention, instead of treating an imbibed organic compound sound image with a separate solution of reducible silver compound, the silver compound may be incorporated into the pre-mordanted imbibition blank before the transfer as described in the following examples

*Example 5.*—A chrome mordanted imbibition blank film is soaked in a 10-per cent solution of disodium phosphate for 10 seconds, wiped to remove surface solution, placed in a 10 per cent solution of calcium acetate for 10 seconds and wiped. This procedure is repeated several times in order to build up a good deposit of calcium phosphate in the gelatin. The blank is then placed in a 10 per cent solution of silver nitrate for 20 seconds, rinsed and placed in the phosphate solution again for 20 seconds, after which it is rinsed and used for receiving a transfer of a hematoxylin sound image, the transfer being made from a relief film such as shown in Fig. 2 and prepared for example, as described in Example 1. The transfer then is placed in hypo solution until cleared of silver phosphate, washed and dried. The image was dull brown in color and has good definition and density. The color of the image obtained may be modified by use of other mordants such as a copper salt in conjunction with the silver salt. Gallein, gallin or similar organic reducing compounds may be used in the above procedure in place of hematoxylin.

*Example 6.*—In a manner similar to that of the preceding example, calcium phosphate was precipitated in the gelatin of a blank motion picture film and the blank then placed in a solution containing 10 per cent silver nitrate and 5 per cent copper nitrate for 20 seconds, rinsed and placed in disodium phosphate for 20 seconds. After rinsing the blank the transfer was made from a hematoxylin dyed sound relief image and treated with hypo as in the preceding example. The image was nearly neutral in color with good definition and density. If desired, silver oxide may be used in the imbibition blank instead of silver phosphate. It may be introduced into the blank by the following means; the gelatin blank may be soaked in a solution of a silver compound, the excess solution removed from the surface by wiping or use of an air squeegee, the blank then placed in a dilute solution of sodium or potassium hydroxide, washed and dried.

The various insoluble silver compounds may be incorporated into the gelatin blanks during the process of manufacture by the methods of photographic emulsion making.

*Example 7.*—Gallin may be used for treatment of a gelatin sound relief image. The gelatin imbibition blank used may contain a silver compound such as silver phosphate and the normal mordanting and hardening compounds such as chrome alum. The relief film, which may be one of the color-separation matrices, but carrying in addition the sound relief image, may be used in making numerous transfers if treated with an oxidizing solution of the following composition:

| | | |
|---|---|---|
| Water | cc | 750 |
| Ferric chloride | grams | 25 |
| Potassium citrate | do | 75 |
| Sodium sulfite (desiccated) | do | 30 |
| Citric acid | do | 20 |
| Sodium thiosulfate | do | 200 |
| Water to | liter | 1 |

The relief film is then dyed in a solution of the appropriate dye (cyan, magenta or yellow). The sound track area of the film is then treated with the following solution which replaces most of the dye in the sound track relief with gallin.

| | | |
|---|---|---|
| Gallein | grams | 3 |
| Formamide | cc | 100 |
| Water | cc | 900 |
| Sodium hydrosulfite | grams | 2 |
| Glacial acetic acid | cc | 30 |

In this solution sodium hydrosulfite reduces gallein to gallin. In making up this solution the acetic acid is added last, approximately 30 minutes after mixing the other ingredients. A transfer is then made onto the water-soaked gelatin blank described above. A normal dye image is thus formed in the picture area while a silver sound track image is formed by reduction of the silver phosphate by the gallin. The transfer is placed in a non-hardening acid hypo solution to dissolve out the unreduced silver phosphate, washed a few minutes and dried. The two remaining dye transfers for the picture area may then be made in the normal manner. Other organic reducing compounds previously mentioned may be used in this embodiment of my invention.

In another embodiment of my invention, a motion picture film carrying a color-component picture relief image and a sound relief image is dyed up as previously described with one of the subtractive dyes and treated in the sound area with one of the organic reducing compounds, for example, hematoxylin. If the treating solution contains a solvent for the dye such as formamide the dye is largely removed from a sound relief. The imbibition blank used for the transfer is mordanted with a compound such as chrome alum and further treated with a silver compound reducible by the organic compound at a pH greater than 7, for example, silver oxalate, silver halide, etc. The transfer is made from the dye relief matrix to the imbibition film whereby the picture image is recorded in the picture area of the blank and the organic compound from the sound relief forms a silver salt with the mordant or other metal salt in the sound area of the blank. Following this the blank is treated in the sound area with ammonia vapors or alkaline solutions reducing the silver salt of the organic compound to a silver sound image, at the point of transfer. Thereafter the residual silver salt is removed with hypo. In case the silver compound used is, for example, silver oxide or silver phosphate, this method may also be used with an organic reducing compound reducing the salts only at a pH above 7 by merely introducing the silver compound into the imbibition blank and after the transfer is made treating with alkaline material. For example, quinizarin-2-sulfonic acid does not reduce silver phosphate at a pH less than 7 but when allowed to react in the presence of alkali such as ammonia, reduction takes place. On the other hand, gallin, gallein and hematoxylin readily reduce silver oxide and silver phosphate at a pH less than 7.

The various embodiments of my invention mentioned above may be used in forming variable density or variable area sound track images.

It is to be understood that the disclosure herein is by way of example and that other modifications are possible within the scope of the appended claims, and that I consider as included in my invention all modifications and equivalents falling within the scope of the appended claims.

What I claim is:

1. The method of recording sound which comprises forming a relief image of the sound, treating said relief image with an organic compound adapted for imbibition printing, capable of being mordanted and capable of reducing a silver compound selected from the group consisting of silver salts and silver oxide, transferring said organic compound from said relief to a mordanted imbibition blank, and reacting said transferred organic compound with said silver compound to form a silver sound image at the point of transfer.

2. The method of recording sound which comprises forming a relief image of the sound, treating said relief image with an organic hydroxyl-containing compound adapted for imbibition printing, capable of being mordanted and capable of reducing a silver compound selected from the group consisting of silver salts and silver oxide, transferring said organic compound from said relief to a mordanted imbibition blank, and reacting said transferred organic compound with said silver compound to form a silver sound image at the point of transfer.

3. The method of recording sound which comprises forming a relief image of the sound, treating said relief image with an organic compound adapted for imbibition printing, capable of being mordanted and capable of reducing a silver compound selected from the group consisting of silver salts and silver oxide, transferring said organic compound from said relief to a mordanted imbibition blank, said organic compound forming a metal salt with the mordant of said blank, and treating the metal salt of said organic compound with said silver compound to form a silver sound image at the point of transfer.

4. The method of recording sound which comprises forming a relief image of the sound, treating said relief image with an organic polyhydroxy compound adapted for imbibition printing, capable of being mordanted and capable of reducing a silver compound selected from the group consisting of silver salts and silver oxide, transferring said organic polyhydroxy compound from said relief image to a mordanted imbibition blank, said organic compound forming a metal salt with the mordant of said blank, and treating the metal salt of said organic compound with said silver compound to form a silver sound image at the point of transfer.

5. The method of recording sound which comprises forming a relief image of the sound, treating said relief image with an organic compound selected from the group consisting of hematoxylin, gallein and gallin, transferring the organic compound image from said relief image to a mordanted imbibition blank to form a metal salt of the organic compound with the mordant, and treating the image composed of the metal salt of the organic compound with a silver compound of the group consisting of silver oxide and silver salts reducible by said organic compound to form a silver sound image at the point of transfer.

6. The method of recording sound which comprises forming a relief image of the sound, treating said relief image with an organic compound adapted for imbibition printing, capable of being mordanted and capable of reducing a silver compound selected from the group consisting of silver salts and silver oxide, transferring said organic compound from said relief to a mordanted imbibition blank containing said silver compound, and reacting said organic compound with said silver compound to form a silver sound image at the point of transfer.

7. The method of recording sound which comprises forming a relief image of the sound, treating said relief image with an organic compound adapted for imbibition printing, capable of being mordanted and capable of reducing a silver compound selected from the group consisting of silver salts and silver oxide at pH less than 7, transferring said organic compound from said relief image to a mordanted imbibition blank containing said silver compound, and reacting said organic compound with said silver compound at a pH less than 7 to form a silver sound image at the point of transfer.

8. The method of recording a sound image which comprises forming a relief image of the sound, treating said relief image with a compound selected from the group consisting of hematoxylin, gallein and gallin, transferring said organic compound from said relief image to a mordanted imbibition blank containing a silver compound selected from the group consisting of silver salts and silver oxide, and reacting said organic compound with said silver compound at a pH less than 7 to form a silver sound image at the point of transfer.

9. The method of recording a sound image which comprises forming a relief image of the sound, treating said relief image with a compound selected from the group consisting of hematoxylin, gallein and gallin, transferring said organic compound from said relief image to a mordanted imbibition blank containing silver phosphate, and reacting said organic compound with the silver phosphate at a pH less than 7 to form a silver sound image at the point of transfer.

10. The method of recording a sound image which comprises forming a relief image of the sound, treating said relief image with hematoxylin, transferring said organic compound from said relief image to a mordanted imbibition blank containing silver phosphate, and reacting said organic compound with the silver phosphate at a pH less than 7 to form a silver sound image at the point of transfer.

11. The method of recording sound which comprises forming a relief image of the sound, treating said relief image with an organic compound adapted for imbibition printing, capable of being mordanted and capable of reducing a silver compound selected from the group consisting of silver salts and silver oxide at a pH greater than 7, transferring said organic compound from said relief to a mordanted imbibition blank containing said silver compound, and reacting said transferred organic compound with said silver compound at a pH greater than 7 to form a silver sound image at the point of transfer.

12. The method of recording sound which comprises forming a relief image of the sound, treating said relief image with an organic compound adapted for imbibition printing, capable of being mordanted and capable of reducing a silver compound selected from the group consisting of silver salts and silver oxide at a pH greater than 7, transferring said organic compound from said relief to a mordanted imbibition blank containing said silver compound, treating said transferred organic compound in the presence of said silver compound with an alkaline material to form a silver sound image at the point of transfer.

13. The method of recording sound which comprises forming a relief image of the sound, treating said relief image with an organic compound selected from the group consisting of gallin, gallein and hematoxylin, transferring said organic compound from said relief to a mordanted imbibition blank containing a silver compound selected from the group consisting of silver salts and silver oxide, treating said transferred organic compound in the presence of said silver compound with an alkaline material to form a silver sound image at the point of transfer.

14. The method of recording sound which comprises forming a relief image of the sound, treating said relief image with an organic compound adapted for imbibition printing, capable of reducing a silver compound selected from the group consisting of silver salts and silver oxide at a pH greater but not less than 7, transferring said organic compound from said relief to a mordanted imbibition blank containing said silver compound, and reacting said transferred organic compound with said silver compound at a pH greater than 7 to form a silver sound image at the point of transfer.

15. The method of recording a sound image and a color component image of a scene which comprises forming in a sensitive photographic film a relief image of the sound and a relief image of the color component of the scene, coloring both relief images with a subtractive dye corresponding to said color component, treating said sound relief image with an organic compound adapted for imbibition printing, capable of being mordanted and capable of reducing a silver compound selected from the group consisting of silver salts and silver oxide, transferring the subtractive dye image from the color component relief and the organic reducing compound from the sound relief to an imbibition blank, and reacting said organic reducing compound with said silver compound to form a silver sound image in the sound area of said imbibition blank, said color component dye image being recorded in the picture area of said imbibition blank.

WALTER J. WEYERTS.